(12) United States Patent
Matsuo et al.

(10) Patent No.: US 11,067,033 B2
(45) Date of Patent: Jul. 20, 2021

(54) DUAL GALLERY STEEL PISTON

(71) Applicant: FEDERAL-MOGUL LLC, Southfield, MI (US)

(72) Inventors: Eduardo Matsuo, Ann Arbor, MI (US); Andrew Leibold, Monroe, MI (US); Timothy Christopher Vezina, Northville, MI (US); Michael Weinenger, Southfield, MI (US); Kai Wang, Ann Arbor, MI (US)

(73) Assignee: Tenneco Inc., Lake Forest, IL (US)

( * ) Notice: Subject to any disclaimer, the term of this patent is extended or adjusted under 35 U.S.C. 154(b) by 0 days.

(21) Appl. No.: 15/980,595

(22) Filed: May 15, 2018

(65) Prior Publication Data

US 2018/0334992 A1 Nov. 22, 2018

Related U.S. Application Data

(60) Provisional application No. 62/507,464, filed on May 17, 2017.

(51) Int. Cl.
*F02F 3/18* (2006.01)
*F02F 3/26* (2006.01)
(Continued)

(52) U.S. Cl.
CPC ............ *F02F 3/18* (2013.01); *B23K 20/12* (2013.01); *F02F 3/003* (2013.01); *F02F 3/22* (2013.01);
(Continued)

(58) Field of Classification Search
CPC ...... F02F 3/18; F02F 3/003; F02F 3/22; F02F 3/26; F02F 2003/0061; B23K 20/12; B23K 2101/003
(Continued)

(56) References Cited

U.S. PATENT DOCUMENTS 3,616,729 A 11/1971 Fischer
3,628,511 A 12/1971 Fischer
(Continued)

FOREIGN PATENT DOCUMENTS

CN 104220736 A 12/2014
CN 105051357 A 11/2015
(Continued)

OTHER PUBLICATIONS

International Search Report, dated Aug. 27, 2018 (PCT/US2018/032859).

*Primary Examiner* — Joseph J Dallo
*Assistant Examiner* — Yi-Kai Wang
(74) *Attorney, Agent, or Firm* — Robert L. Stearns; Dickinson Wright, PLLC

(57) ABSTRACT

A piston capable of operating at a high temperature and consequently contributing to a high in-cylinder temperature, as well as reducing engine oil temperature, when used in an internal combustion engine, is provided. The piston includes an upper portion and a lower portion welded together to present a cooling gallery therebetween. The cooling gallery extends circumferentially around a center axis of the piston and is spaced the center axis. A partition is located in the cooing gallery and extends from one inner surface to another inner surface of the cooling gallery. The partition extends circumferentially around the center axis, and divides the cooling gallery into at least a first gallery portion and a second gallery portion. The partition can be formed as one piece with the upper portion or the lower portion. Alternatively, the partition can be formed as a separate piece from the upper portion and the lower portion.

13 Claims, 5 Drawing Sheets

(51) Int. Cl.
*B23K 20/12* (2006.01)
*F02F 3/00* (2006.01)
*F02F 3/22* (2006.01)
*B23K 101/00* (2006.01)

(52) U.S. Cl.
CPC .......... *F02F 3/26* (2013.01); *B23K 2101/003* (2018.08); *F02F 2003/0061* (2013.01)

(58) Field of Classification Search
USPC ...................................................... 123/41.35
See application file for complete search history.

(56) References Cited

U.S. PATENT DOCUMENTS

| | | | |
|---|---|---|---|
| 4,175,502 A | 11/1979 | Moebus | |
| 4,587,932 A | 5/1986 | Moebus | |
| 5,483,869 A | 1/1996 | Bock et al. | |
| 6,477,941 B1 * | 11/2002 | Zhu | F02F 3/003 92/186 |
| 6,763,758 B2 | 7/2004 | Kemnitz et al. | |
| 8,011,288 B2 * | 9/2011 | Gniesmer | F02F 3/22 92/217 |
| 8,973,548 B2 | 3/2015 | Andreas | |
| 8,974,484 B2 | 3/2015 | Alferness et al. | |
| 2009/0288618 A1 | 11/2009 | Issler et al. | |
| 2010/0263620 A1 * | 10/2010 | Sadowski | F02F 3/22 123/193.6 |
| 2012/0263620 A1 * | 10/2012 | Carberry | F41H 5/02 419/66 |
| 2012/0304956 A1 | 12/2012 | Wang et al. | |
| 2014/0102294 A1 * | 4/2014 | Klein | F02F 3/22 92/208 |
| 2014/0202404 A1 | 7/2014 | Weinenger et al. | |
| 2015/0090215 A1 * | 4/2015 | Boczek | F02F 3/20 123/193.6 |
| 2015/0337959 A1 | 11/2015 | Schneider | |

FOREIGN PATENT DOCUMENTS

| | | | |
|---|---|---|---|
| CN | 106460721 A | 2/2017 | |
| DE | 8023117 U1 * | 1/1981 | ............. F02F 3/003 |
| DE | 8023117 U1 | 1/1981 | |
| DE | 102004038465 A1 * | 2/2006 | ............. F02F 3/003 |
| DE | 102004038465 A1 | 2/2006 | |
| DE | 102016118645 A1 | 4/2017 | |

* cited by examiner

DUAL GALLERY STEEL PISTON

CROSS REFERENCE TO RELATED APPLICATION

This U.S. utility patent application claims priority to U.S. provisional patent application No. 62/507,464, filed May 17, 2017, the contents of which is incorporated herein by reference in its entirety.

BACKGROUND OF THE INVENTION

1. Field of the Invention

This invention relates generally to pistons for internal combustion engines, and methods for manufacturing the pistons.

2. Related Art

Pistons used in internal combustion engines, such as heavy duty diesel pistons, are exposed to extremely high temperatures during operation, especially along the crown of the piston. Therefore, to moderate the temperature, some pistons are designed with a cooling gallery, and cooling oil is sprayed into the cooling gallery as the piston reciprocates along a cylinder bore of the engine. The oil flows along the inner surface of the crown and dissipates heat away from the crown. However, to control the piston temperature during operation, a high flow of oil must be maintained constantly. In addition, the oil degrades over time due to the high temperature of the internal combustion engine, and the oil must be changed periodically to maintain engine life. Furthermore, when the cooling gallery temperature exceeds 350° C., the oil tends to burn at a higher rate, referred to as oil coking, and adhere to the surface of the gallery.

However, piston and engine manufacturers continuously strive to develop new and improved methods to better maintain heat in the combustion chamber, reduce the operating temperature of the piston, and thus further improve engine brake thermal efficiency. In addition, manufacturers of steel pistons for heavy duty diesel engines are constantly challenged to design the pistons such that the maximum temperature at a bowl rim and/or bowl apex of the crown, the maximum temperature at the closed cooling gallery, and/or the maximum temperature at the undercrown surfaces are within an acceptable range, for example to avoid bowl rim oxidation or erosion, coked oil deposits along the cooling gallery and/or undercrown surfaces, and to reduce oil degradation.

SUMMARY

One aspect of the invention comprises a piston for an internal combustion engine capable of performing well during operation. The piston includes a body having an upper portion and a lower portion with a cooling gallery therebetween. The cooling gallery extends circumferentially around a center axis of the body and is spaced from the center axis. The body includes inner wall surfaces surrounding the cooling gallery, and the body includes a partition disposed in the cooing gallery and extending from one of the inner surfaces to another one of the inner surfaces. The partition extends circumferentially around the center axis, and the partition divides the cooling gallery into at least first gallery portion and a second gallery portion.

Another aspect of the invention provides a method of manufacturing a piston. The method comprises steps of joining an upper portion of a body to a lower portion of the body to form a cooling gallery therebetween. The cooling gallery extends circumferentially around a center axis of the body and is spaced from the center axis. The body includes inner wall surfaces surrounding the cooling gallery. The body also includes a partition disposed in the cooing gallery and extending from one of the inner surfaces to another one of the inner surfaces. The partition extends circumferentially around the center axis, and the partition divides the cooling gallery into at least a first gallery portion and a second gallery portion.

BRIEF DESCRIPTION OF THE DRAWINGS

Other advantages of the present invention will be readily appreciated, as the same becomes better understood by reference to the following detailed description when considered in connection with the accompanying drawing wherein.

DETAILED DESCRIPTION OF THE EXAMPLE EMBODIMENTS

One aspect of the invention is a piston 10 capable of operating at a high temperature and consequently contributing to a high in-cylinder temperature, as well as reducing engine oil temperature, when used in an internal combustion engine. An example of the piston 10 is shown in FIG. 1, but many other designs are possible.

Figure 1:
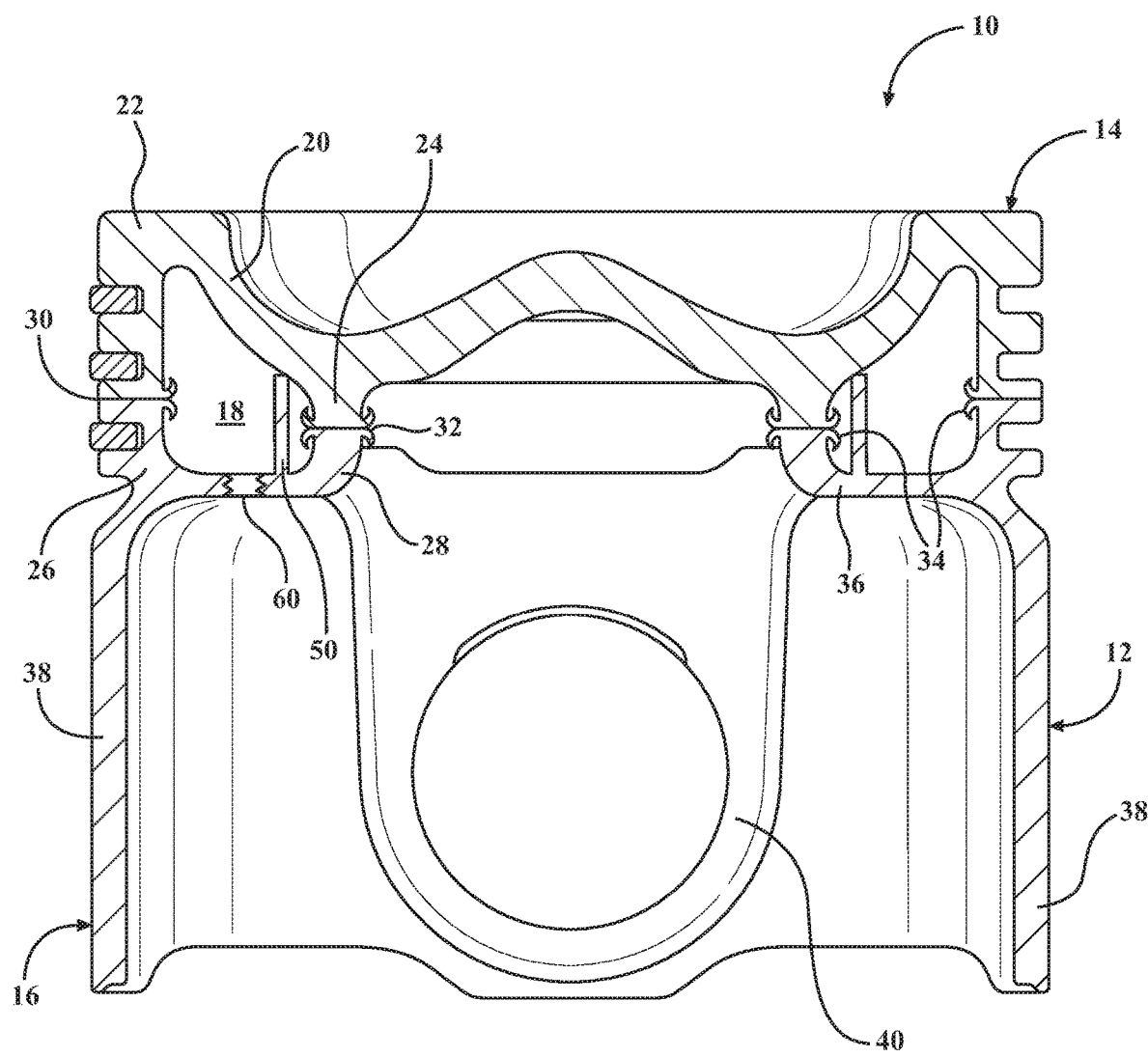
FIG. 1 is a side cross-sectional view of a piston including a partition in a cooling gallery according to one example embodiment.

As shown in FIG. 1, the piston 10 includes a body 12 having an upper portion 14 and a lower portion 16 with a cooling gallery 18 therebetween. The upper and lower portions 14, 16 of the body 12 are separately formed of steel. In the example embodiment, the upper portion 14 includes an upper combustion wall 20, and the upper combustion wall 20 presents a combustion bowl surrounded by an outer rim. The upper portion 14 also includes an upper outer rib 22 depending from the outer rim of the upper combustion wall 20, and an upper inner rib 24 depending from the upper combustion wall 20 opposite the combustion bowl. The upper outer rib 22 extends circumferentially around a center axis A of the body 12 and is spaced from the center axis A of the body 12, and the upper inner rib 24 extends circumferentially around the center axis A of the body 12 and is located between the center axis A of the body 12 and the upper outer rib 22.

In the example embodiment, the lower portion 16 of the body 12 includes a lower outer rib 26 extending circumferentially around the center axis A of the body 12 and spaced from the center axis A of the body 12, and a lower inner rib 28 extending circumferentially around the center axis A of the body 12 and located between the center axis A of the body 12 and the lower outer rib 26. The lower outer rib 26 is welded to the upper outer rib 22 at an outer weld joint 30, and the lower inner rib 28 is welded to the upper inner rib 24 at an inner weld joint 32. The weld joints 30, 32 extend circumferentially around the center axis A of the piston 10. The body 12 includes flash 34 in the form of weld curls located adjacent the weld joints 30, 32. The flash 34 is formed during the welding process, which is typically a friction welding process. The lower portion 16 also includes a lower wall 36 located between the lower outer rib 26 and the lower inner rib 28. In the example embodiment of FIG. 1, the lower portion 16 of the body 12 includes skirt sections 38 depending from the lower outer rib 26 and spaced from one another circumferentially by pin bosses 40, and each of the pin bosses 40 presents a pin bore.

As shown in FIGS. 2-5, the upper combustion wall 20 includes an upper inner surface 42 located between the upper outer rib 22 and the upper inner rib 24, the lower wall 36 includes a lower inner surface 44, the inner ribs 24, 28 present a first inner surface 46, and the outer ribs 22, 26 present a second inner surface 48. The inner surfaces 42, 44, 46, 48 face and surround the cooling gallery 18. The cooling gallery 18 extends circumferentially around the center axis A of the body 12 and is spaced from the center axis A.

As shown in FIGS. 1-5, and best shown in FIGS. 2-5, the piston 10 also includes a partition 50 disposed in the cooing gallery 18 and extending from one of the inner surfaces 42, 44, 46, 48 to another one of the inner surfaces 42, 44, 46, 48. The partition 50 extends circumferentially around the center axis A and divides the cooling gallery 18 into at least a first gallery portion 52 and a second gallery portion 54. For example, the partition 50 can divide the cooling gallery 18 vertically, horizontally, at an angle, or in another manner. In the example embodiments, the partition 50 projects into the gallery 18 from one inner surface 42, 44, 46, 48 and terminates at another inner surface 42, 44, 46, 48 to physically isolate and separate at least one of the weld joints 30 or 32 in the first gallery portion 52 apart from the remaining second gallery portion 54.

In the example embodiments, the partition 50 seals the first gallery portion 52 and separates the first gallery portion 52 from the second gallery portion 54. The first gallery portion 52 contains air for insulation, or another insulating medium, and the second gallery portion 54 contains cooling oil. The partition 50 physical separates the inner weld joint 32 located in the first gallery portion 52 from the cooling oil. In some embodiments, the partition 50 is formed as one piece with the upper portion 14 or the lower portion 16. Alternatively, the partition 50 can be formed as a separate piece from the upper and lower portions 14, 16. For example, two of the inner surfaces 42, 44, 46, 48 can include grooves 56, and the partition 50 can be disposed in the grooves 56. In this case, the partition 50 can be a plate that spans the length of the cooling gallery 18 and which is inserted into the upper or lower portion 14, 16 of the body 12 prior to welding. The plate remains inside the cooling gallery 18 after welding to divide the cooling gallery 18 into two parts.

The partition 50 can extend straight from one of the inner surfaces 42, 44, 46, 48 to another one of the inner surfaces 42, 44, 46, 48, or the partition 50 can curve from one of the inner surfaces 42, 44, 46, 48 to another one of the inner surfaces 42, 44, 46, 48. The partition 50 could extend from the lower portion 14 to the upper portion 16 of the body 12, or vice versa. The partition 50 could alternatively extend from one of the inner surfaces 42, 44, 46, 48 of the upper portion 14 to another one of the inner surfaces 42, 44, 46, 48 of the upper portion 16. The partition 50 could also extend from one of the inner surfaces 42, 44, 46, 48 of the lower portion 14 to another one of the inner surfaces 42, 44, 46, 48 of the lower portion 16.

Figure 2:
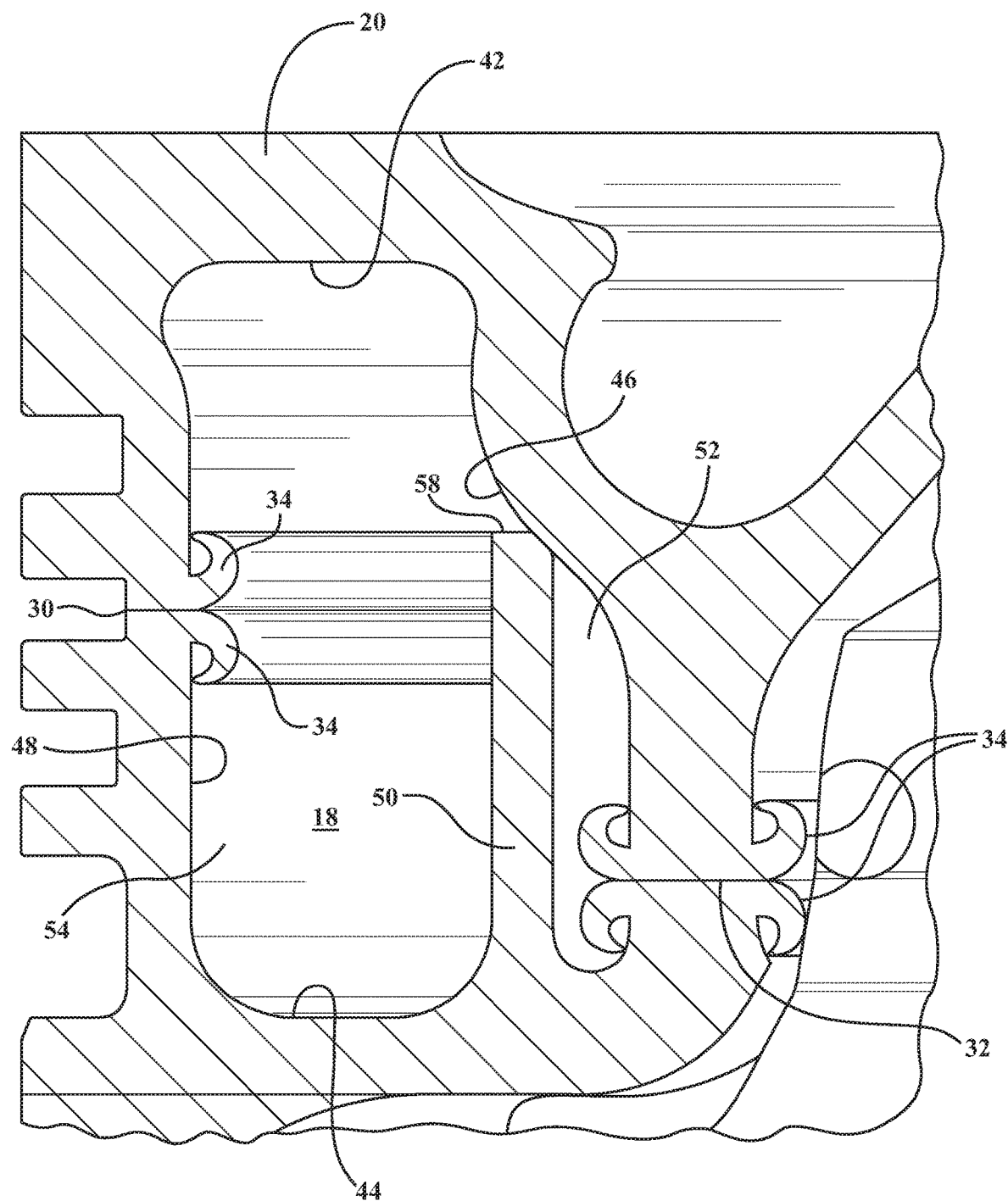
FIG. 2 is an enlarged view of the cooling gallery of the piston of FIG. 1.

In the example embodiment of FIGS. 1 and 2, the partition 50 is formed as one piece with the lower wall 36 and extends upwardly from the lower wall 36 straight to a distal end 58 at the upper inner surface 42 of the upper combustion wall 20. The partition 50 has a cylindrical shape extending circumferentially around the center axis A of the body 12. In this embodiment, the distal end 58 of the partition 50 contacts or engages the upper inner surface 42. Alternatively, the distal end 58 could nearly contact the upper inner surface 42 and thus is located adjacent the upper inner surface 42. The first gallery portion 52 is located between the partition 50 and the inner ribs 24, 28, and the second gallery portion 54 is located between the outer ribs 22, 26 and the partition 50. The first gallery portion 52 is located radially inward of the second gallery portion 54. The first and second gallery portions 52, 54 both have a volume, and the volume of the second gallery portion 54 is larger than the volume of the first gallery portion 52. The weld curls located along the inner weld joint 32 in the first gallery portion 52 are physically separated from the second gallery portion 54 by the partition 50. The first gallery portion 52 is sealed and contains air. The lower portion 16 of the body includes an oil inlet 60 to the second gallery portion 54, and the second gallery portion 54 contains cooling oil. Any slivers or other portions of the welding curls adjacent the inner weld joint 32 that may develop will be contained in the first gallery portion 52 and not exposed to the cooling oil in the second gallery portion 54.

Figure 3:
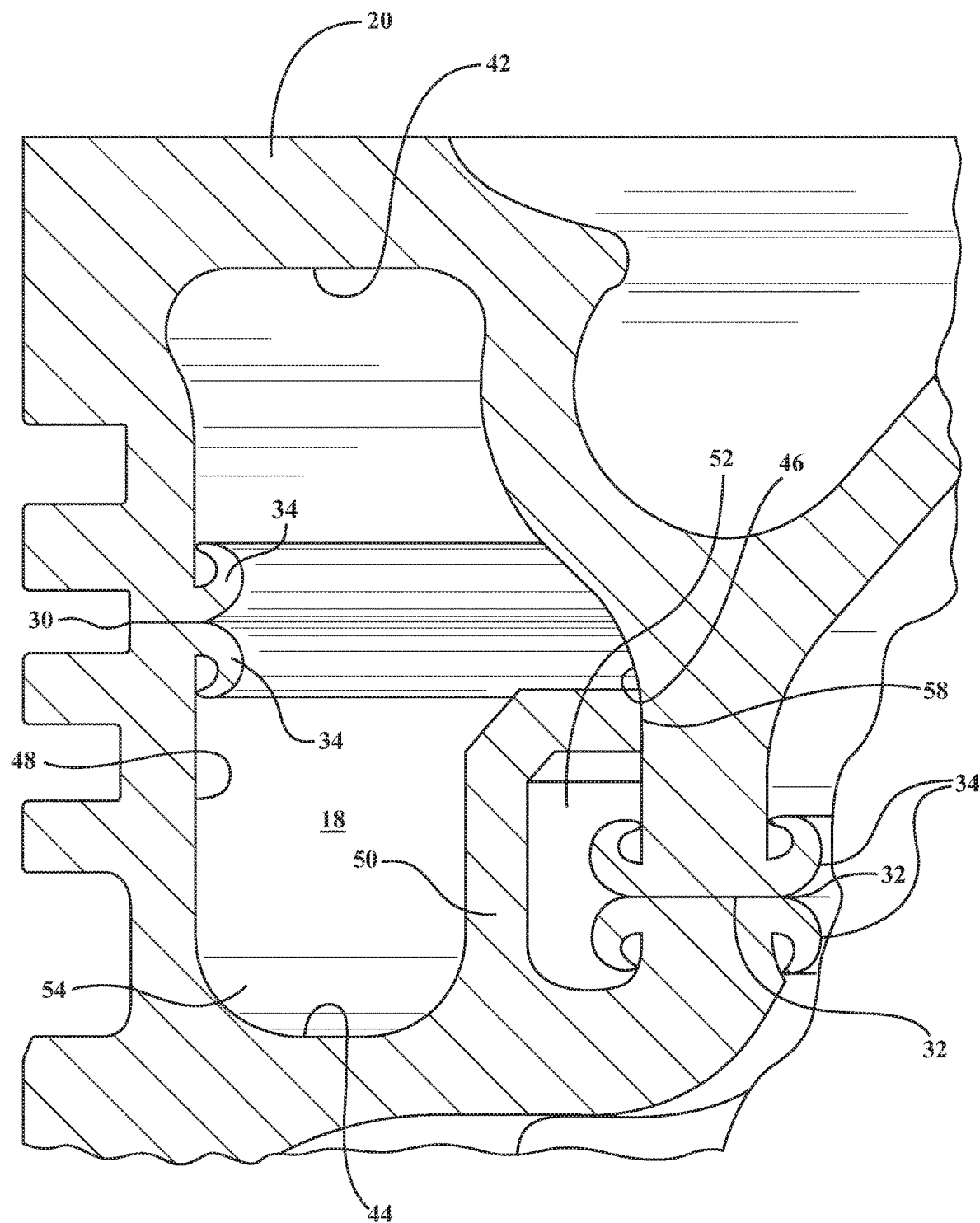
FIG. 3 is an enlarged view of a portion of a piston including a partition in a cooling gallery according to a second example embodiment.

In the example embodiment of FIG. 3, the partition 50 is formed integral or as one piece with the lower wall 36 and extends upwardly from the lower wall 36. In this case, the partition 50 curves to a distal end 58 at the first inner surface 46 of the upper inner rib 24. More specifically, the partition 50 has a dome-shape (inverted J-shaped cross-section) that terminates at a radially inwardly facing circumferential face that overlies the first weld joint 32 and engages or is closely spaced from the first inner surface 46 of the upper inner rib 24, such that the first weld joint 32 is captured within the first gallery portion 52 defined by the relatively small space between the partition 50 and the inner ribs 24, 28, and the second gallery portion 54 is defined by the balance of the cooling gallery 18. In this embodiment of FIG. 3, the distal end 58 of the partition 50 contacts or engages the first inner surface 46. Alternatively, the distal end 58 could nearly contact the first inner surface 46 and thus is located adjacent the first inner surface 46. The first gallery portion 52 is located between the partition 50 and a portion of the inner ribs 24, 28 and a portion of the lower wall 36. The embodiment of FIG. 3 serves to maximize the surface of the second gallery 54 exposed to the cooling oil, while keeping the oil physically separate from the flash 34 adjacent the inner weld joint 32 that is captured and contained wholly within the first gallery portion 52. The volume of the second gallery portion 54 is larger than the volume of the first gallery portion 52. The flash 34, in the form of weld curls, located along the inner weld joint 32 in the first gallery portion 52 is physically separated from the second gallery portion 54 by the partition 50. The first gallery portion 52 is sealed and contains air. The lower portion 16 of the body 12 includes an oil inlet 60 to the second gallery portion 54, and the second gallery portion 54 contains cooling oil.

Figure 4:
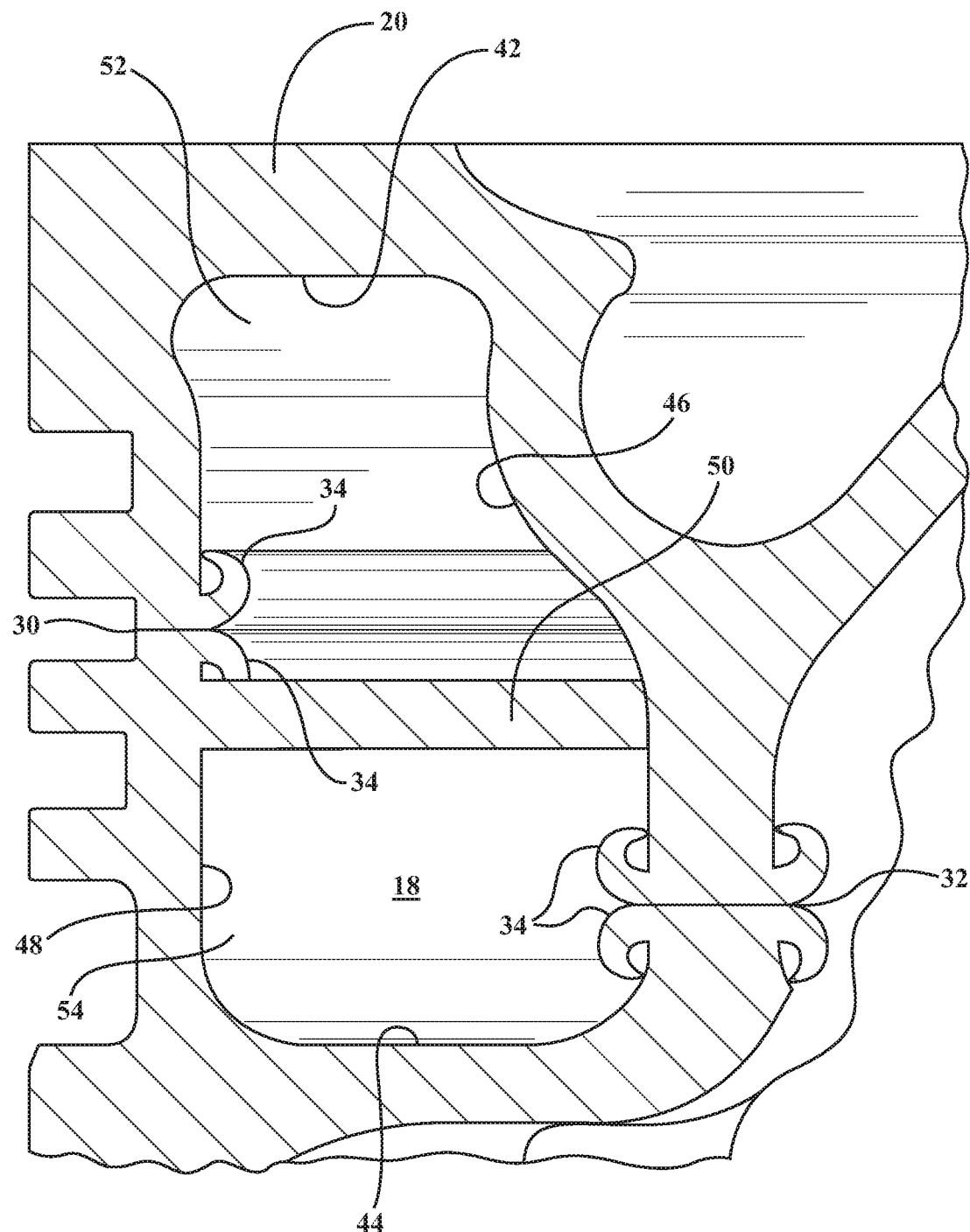
FIG. 4 is an enlarged view of a portion of a piston including a partition in a cooling gallery according to a third example embodiment.

In the example embodiment of FIG. 4, the partition 50 is formed as one piece with the lower outer rib 26 and extends horizontally from the lower outer rib 26 to a distal end 58 at the first inner surface 46 of the upper inner rib 24. In this embodiment, the distal end 58 of the partition 50 contacts or engages the first inner surface 46. Alternatively, the distal end 58 could nearly contact the first inner surface 46 and thus is located adjacent the first inner surface 46. The first gallery portion 52 is located between the partition 50 and the upper inner surface 42 of the upper combustion wall 20, and the second gallery portion 54 is located between the partition 50 and the lower inner surface 44 of the lower wall 36. The partition 50 locates the outer weld joint 30 and flash 34 in the upper first gallery portion 52 and the inner weld joint 32 and flash 34 in the lower second gallery portion 54. The partition 50 keeps the cooling oil of the second gallery portion 52 from entering the upper first gallery portion 52. The flash 34 is located along the inner weld joint 32 in the first gallery portion 52 and is physically separated from the second gallery portion 54 by the partition 50. The first gallery portion 52 is sealed and contains air. The lower portion 16 of the body 12 includes an oil inlet 60 to the second gallery portion 54, and the second gallery portion 54 contains cooling oil.

Figure 5:
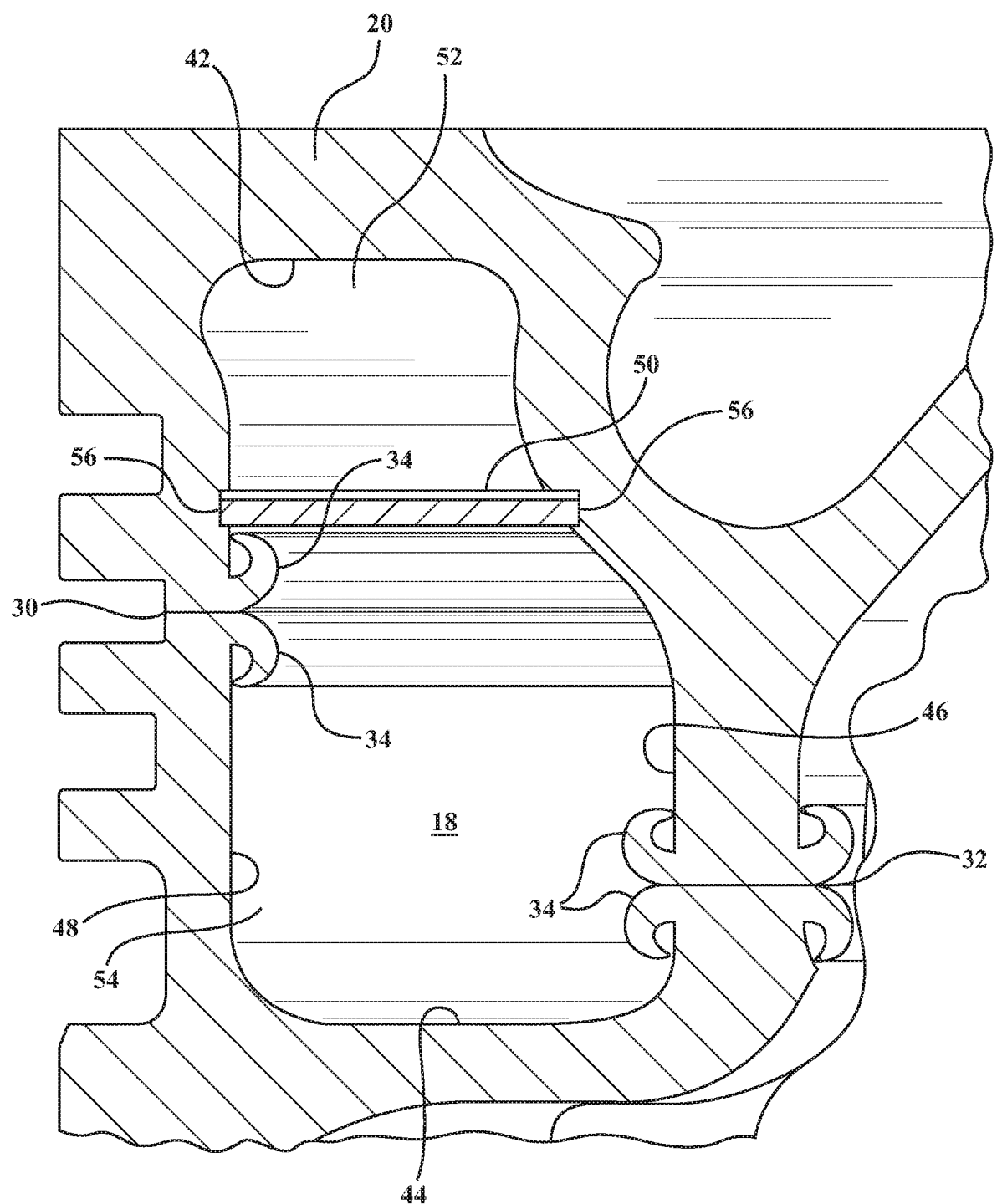
FIG. 5 is an enlarged view of a portion of a piston including a partition in a cooling gallery according to a fourth example embodiment.

In the example embodiment of FIG. 5, the partition 50 is a ring-shaped piece formed separate from the body 12 of the piston 10. The first inner surface 46 of the upper inner rib 24 includes a first groove 56, and the second inner surface 48 of the upper outer rib 22 includes a second groove 56 horizontally aligned with the first groove 56. The partition 50 extends horizontally from the first groove 56 to the second groove 56. The first gallery portion 52 is located between the partition 50 and the upper inner surface 42 of the upper combustion wall 20, and the second gallery portion 54 is located between the partition 50 and the lower inner surface 44 of the lower wall 36. The second gallery portion 54 includes weld curls between the upper and lower ribs 22, 24 26, 28 which are physically separated from the first gallery portion 52 by the partition 50. The first gallery portion 52 is sealed and contains air. The lower portion 16 of the body 12 includes an oil inlet to the second gallery portion 54, and the second gallery portion 54 contains cooling oil.

Another aspect of the invention provides a method of manufacturing the piston. The method then includes joining the upper portion of the body to the lower portion of the body to form a cooling gallery therebetween. According to an example embodiment, the method includes first forming the upper portion of the body separate from the lower portion of the body. The partition can be formed together as one piece with the upper or lower portion of the body. For example, the partition can be machined in the lower portion of the body or the upper portion of the body before welding the upper portion to the lower portion. Alternatively, the partition can be formed as a separate piece from the body, and the partition can be disposed between the inner wall surfaces before joining the upper portion to the lower portion. The joining step includes welding the upper ribs to the lower ribs, for example by friction welding. The welding step causes the steel material of the body to form the weld curls adjacent the weld joints.

The partition in the cooling gallery can provide several advantages. The partition can prevent weld slivers, which are slivers of metal created during the friction welding process, from getting into the engine oil by enclosing at least one of the weld joints and thus the weld curls into one of the gallery portions that is closed off from the engine oil. For example, the weld joints and thus the weld curls could be located only in the first gallery portion, and the engine oil could be located in the second gallery portion, which does not include the weld curls.

Dividing the cooling gallery into two or more distinct gallery portions, for example an oil cooled region and an air filled (not oil cooled) region, can provide a number of other benefits. First, certain engine designs/applications perform better under high in-cylinder temperature conditions. By leaving an insulating air gap at the top of the piston, the piston temperature, and consequently the in-cylinder temperature, will be hotter. The air acts as an insulator, and thus the air gap helps to increase the piston temperature more than if this region were filled in with steel. The gallery portion containing also reduces piston mass comparatively. When the first gallery portion is located at the top of the piston and contains air, the second gallery portion located at a lower portion of the piston can function as a typical piston gallery, with an oil inlet and exit. This will help balance piston temperatures so that the temperatures should not exceed the operational boundary temperatures of the steel. Additionally, this lower second gallery portion of the cooling gallery will reduce the temperatures of the pin bore and skirt sections, compared to a completely air filled cooling gallery. This is important for the tribology of these interfaces.

Second, even if in-cylinder high temperatures are not beneficial, use of the partition in the body of the piston can improve the life of the engine oil. If the engine oil is kept in the lower gallery portion and thus further away from the hottest portions of the piston (e.g. the upper combustion wall of the piston and bowl rim), the oil temperature rise in the cooling gallery can be reduced. Lower oil operating temperature prevents the oil from degrading or oxidizing and increases engine oil life. It also reduces carbon build up in the cooling gallery (i.e. burnt oil that has adhered to the inner walls).

It will be understood that in any of the above embodiments that the partition could extend at an angle across the gallery or take on a non-planar shape and that additional partitions could be provided to divide the gallery into more than two spaces (three or more) and could include walling off both the inner and outer weld joints from the portion of the gallery carrying the cooling oil.

Obviously, many modifications and variations of the present invention are possible in light of the above teachings and may be practiced otherwise than as specifically described while within the scope of the following claims. In particular, all features of all claims and of all embodiments can be combined with each other, as long as they do not contradict each other.

The invention claimed is:

1. A piston, comprising:
a body having an upper portion formed of a single piece of material and a lower portion formed of a single piece of material, the upper portion and the lower portion joined to one another and each including inner surfaces forming a cooling gallery therebetween, said cooling gallery extending circumferentially around a center axis of said body and spaced from said center axis, said lower portion including a partition extending into said cooing gallery and having a distal end engaging one of said inner surfaces of said upper portion, said partition extending circumferentially around said center axis, said partition dividing said cooling gallery into at least a first gallery portion and a second gallery portion, and said partition sealing said first gallery portion and said second gallery portion, wherein said body is formed of steel, said upper portion of said body includes an upper combustion wall, said upper combustion wall presents a combustion bowl surrounded by an outer rim, said upper portion includes an upper outer rib depending from said outer rim of said upper combustion wall, said upper outer rib extends circumferentially around said center axis of said body and is spaced from said center axis of said body, said upper portion includes an upper inner rib depending from said upper combustion wall opposite said combustion bowl, said upper inner rib extends circumferentially around said center axis of said body and is located between said center axis of said body and said upper outer rib, said lower portion of said body includes a lower outer rib extending circumferentially around said center axis of said body and spaced from said center axis of said body, said lower outer rib is welded to said upper outer rib at an outer weld joint, said lower portion of said body includes a lower inner rib extending circumferentially around said center axis of said body and located between said center axis of said body and said lower outer rib, said lower inner rib is welded to said upper inner rib at an inner weld joint, said lower portion includes a lower wall located between said lower outer rib and said lower inner rib, said upper combustion wall includes an upper inner surface located between said upper outer rib and said upper inner rib, said lower wall includes a lower inner surface, said inner ribs present a first inner surface, and said outer ribs present a second inner surface, said inner surfaces face and surround said cooling gallery, and said body includes flash located adjacent said weld joints, and wherein said partition extends upwardly from said lower wall to said distal end at or adjacent said upper inner surface of said upper combustion wall such that said first gallery portion is located between said partition and said inner ribs and said second gallery portion is located between said outer ribs and said partition, said second gallery portion has a volume larger than a volume of said first gallery portion, said partition has a cylindrical shape, said flash is located along said first weld joint in said first gallery portion and is physically separated from said second gallery portion by said partition, said second gallery portion contains cooling oil, and said first gallery portion contains air.

2. The piston of claim 1, wherein said upper ribs are friction welded to said lower ribs at said weld joints.

3. The piston of claim 1, wherein said partition curves to one of said inner surfaces of said upper portion.

4. The piston of claim 1, wherein said lower portion of said body includes skirt sections depending from said lower outer rib and spaced from one another circumferentially by pin bosses, and each of said pin bosses presents a pin bore.

5. A piston comprising:
a body having an upper portion formed of a single piece of material and a lower portion formed of a single piece of material, the upper portion and the lower portion joined to one another and each including inner surfaces forming a cooling gallery therebetween, said cooling gallery extending circumferentially around a center axis of said body and spaced from said center axis, said lower portion including a partition extending into said cooing gallery and having a distal end engaging one of said inner surfaces of said upper portion, said partition extending circumferentially around said center axis, said partition dividing said cooling gallery into at least a first gallery portion and a second gallery portion, and said partition sealing said first gallery portion and said second gallery portion, wherein said body is formed of steel, said upper portion of said body includes an upper combustion wall, said upper combustion wall presents a combustion bowl surrounded by an outer rim, said upper portion includes an upper outer rib depending from said outer rim of said upper combustion wall, said upper outer rib extends circumferentially around said center axis of said body and is spaced from said center axis of said body, said upper portion includes an upper inner rib depending from said upper combustion wall opposite said combustion bowl, said upper inner rib extends circumferentially around said center axis of said body and is located between said center axis of said body and said upper outer rib, said lower portion of said body includes a lower outer rib extending circumferentially around said center axis of said body and spaced from said center axis of said body, said lower outer rib is welded to said upper outer rib at an outer weld joint, said lower portion of said body includes a lower inner rib extending circumferentially around said center axis of said body and located between said center axis of said body and said lower outer rib, said lower inner rib is welded to said upper inner rib at an inner weld joint, said lower portion includes a lower wall located between said lower outer rib and said lower inner rib, said upper combustion wall includes an upper inner surface located between said upper outer rib and said upper inner rib, said lower wall includes a lower inner surface, said inner ribs present a first inner surface, and said outer ribs present a second inner surface, said inner surfaces face and surround said cooling gallery, and said body includes flash located adjacent said weld joints, and wherein said partition extends upwardly from said lower wall and curves to said distal end at or adjacent said first inner surface of said upper inner rib such that said first gallery portion is located between said partition and a portion of said inner ribs and a portion of said lower wall, and said second gallery portion has a volume larger than a volume of said first gallery portion, said flash is located along said first weld joint in said first gallery portion and is physically separated from said second gallery portion by said partition, said lower portion of said body includes an oil inlet to said second gallery portion, said second gallery portion contains cooling oil, and said first gallery portion is sealed and contains air.

6. A piston comprising:
a body having an upper portion formed of a single piece of material and a lower portion formed of a single piece of material, the upper portion and the lower portion joined to one another and each including inner surfaces forming a cooling gallery therebetween, said cooling gallery extending circumferentially around a center axis of said body and spaced from said center axis, said lower portion including a partition extending into said cooing gallery and having a distal end engaging one of said inner surfaces of said upper portion, said partition extending circumferentially around said center axis, said partition dividing said cooling gallery into at least a first gallery portion and a second gallery portion, and said partition sealing said first gallery portion and said second gallery portion, wherein said body is formed of steel, said upper portion of said body includes an upper combustion wall, said upper combustion wall presents a combustion bowl surrounded by an outer rim, said upper portion includes an upper outer rib depending from said outer rim of said upper combustion wall, said upper outer rib extends circumferentially around said center axis of said body and is spaced from said center axis of said body, said upper portion includes an upper inner rib depending from said upper combustion wall opposite said combustion bowl, said upper inner rib extends circumferentially around said center axis of said body and is located between said center axis of said body and said upper outer rib, said lower portion of said body includes a lower outer rib extending circumferentially around said center axis of said body and spaced from said center axis of said body, said lower outer rib is welded to said upper outer rib at an outer weld joint, said lower portion of said body includes a lower inner rib extending circumferentially around said center axis of said body and located between said center axis of said body and said lower outer rib, said lower inner rib is welded to said upper inner rib at an inner weld joint, said lower portion includes a lower wall located between said lower outer rib and said lower inner rib, said upper combustion wall includes an upper inner surface located between said upper outer rib and said upper inner rib, said lower wall includes a lower inner surface, said inner ribs present a first inner surface, and said outer ribs present a second inner surface, said inner surfaces face and surround said cooling gallery, and said body includes flash located adjacent said weld joints, and wherein said partition extends horizontally from said lower outer rib to said distal end at or adjacent said first inner surface of said upper inner rib, said first gallery portion is located between said partition and an upper inner surface of said upper combustion wall and said second gallery portion is located between said partition and said lower inner surface of said lower wall, said flash is located along said second weld joint in said first gallery portion and is physically separated from said second gallery portion by said partition, said lower portion of said body includes an oil inlet to said second gallery portion, said second gallery portion contains cooling oil, and said first gallery portion is sealed and contains air.

7. A piston, comprising: a body having an upper portion and a lower portion with a cooling gallery therebetween, said cooling gallery extending circumferentially around a center axis of said body and spaced from said center axis, said upper portion and said lower portion welded to one another along a weld joint, a partition disposed in said cooing gallery, said partition extending circumferentially around said center axis, said partition dividing said cooling gallery into at least a first gallery portion and a second gallery portion, said partition sealing said first gallery portion and said second gallery portion, said partition being disposed perpendicular to said center axis, and said partition being disposed entirely above said weld joint.

8. A method of manufacturing a piston, comprising the step of: welding an upper portion of a body to a lower portion of the body along a weld joint to form a cooling gallery between the upper portion and the lower portion, the cooling gallery extending circumferentially around a center axis of the body and spaced from the center axis, and disposing a partition in the cooling gallery, the partition extending circumferentially around the center axis and dividing the cooling gallery into at least a first gallery portion and a second gallery portion, the partition sealing the first gallery portion and the second gallery portion, the partition being disposed perpendicular to the center axis, and the partition being disposed entirely above the weld joint.

9. The piston of claim 7, wherein said partition is formed as one piece with said upper portion or said lower portion.

10. The piston of claim 7, wherein said partition is formed as a separate piece from said upper portion and said lower portion.

11. The piston of claim 10, wherein two of said inner surfaces include grooves, and said partition is disposed in said grooves.

12. The piston of claim 7, wherein a first inner surface of said upper portion includes a first groove, a second inner surface of said upper portion includes a second groove horizontally aligned with said first groove, said partition is a ring-shaped piece separate from said body and extends horizontally from said first groove to said second groove, said second gallery portion includes flash physically separated from said first gallery portion by said partition, said lower portion of said body includes an oil inlet to said second gallery portion, said second gallery portion contains cooling oil, and said first gallery portion is sealed and contains air.

13. The method of claim 8, wherein the partition is a separate piece from the upper portion and the lower portion, and the method includes disposing the partition between inner wall surfaces of the upper portion before joining the upper portion to the lower portion.

* * * * *